(12) United States Patent
Kikkeri et al.

(10) Patent No.: US 10,195,741 B2
(45) Date of Patent: *Feb. 5, 2019

(54) CONTROLLING A ROBOT IN THE PRESENCE OF A MOVING OBJECT

(71) Applicant: Microsoft Technology Licensing, LLC, Redmond, WA (US)

(72) Inventors: Harshavardhana Kikkeri, Newcastle, WA (US); Bryan J. Thibodeau, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 194 days.

This patent is subject to a terminal disclaimer.

(21) Appl. No.: 15/224,109

(22) Filed: Jul. 29, 2016

(65) Prior Publication Data

US 2016/0354927 A1 Dec. 8, 2016

Related U.S. Application Data

(63) Continuation of application No. 14/172,230, filed on Feb. 4, 2014, now Pat. No. 9,452,531.

(51) Int. Cl.
*B25J 9/16* (2006.01)
*F16P 3/14* (2006.01)
(Continued)

(52) U.S. Cl.
CPC .......... *B25J 9/1676* (2013.01); *F16P 3/142* (2013.01); *G06T 1/0014* (2013.01);
(Continued)

(58) Field of Classification Search
CPC ....... H04N 13/204; G06T 1/0014; G06T 7/20; G06T 7/0004; G06T 2207/30196;
(Continued)

(56) References Cited

U.S. PATENT DOCUMENTS 5,347,459 A * 9/1994 Greenspan .............. B25J 9/1666
345/424
5,548,694 A * 8/1996 Frisken Gibson ...... G06T 15/10
345/424

(Continued)

FOREIGN PATENT DOCUMENTS

WO 2010063319 A1 6/2010

OTHER PUBLICATIONS

Final Office Action for U.S. Appl. No. 14/172,230, dated Sep. 30, 2015, 9 pages.

(Continued)

*Primary Examiner* — Jason Holloway
(74) *Attorney, Agent, or Firm* — International IP Law Group PLLC

(57) ABSTRACT

A method, system, and one or more computer-readable storage media for controlling a robot in the presence of a moving object are provided herein. The method includes capturing a number of frames from a three-dimensional camera system and analyzing a frame to identify a connected object. The frame is compared to a previous frame to identify a moving connected object (MCO). If an unexpected MCO is in the frame a determination is made if the unexpected MCO is in an actionable region. If so, the robot is instructed to take an action.

18 Claims, 7 Drawing Sheets

(51) Int. Cl.
  *G06T 7/00*      (2017.01)
  *G06T 7/20*      (2017.01)
  *G06T 1/00*      (2006.01)
  *H04N 13/204*    (2018.01)

(52) U.S. Cl.
  CPC .............. *G06T 7/0004* (2013.01); *G06T 7/20* (2013.01); *G05B 2219/37567* (2013.01); *G05B 2219/37571* (2013.01); *G05B 2219/39091* (2013.01); *G05B 2219/40202* (2013.01); *G05B 2219/40203* (2013.01); *G05B 2219/49152* (2013.01); *G05B 2219/49158* (2013.01); *G06T 2207/10021* (2013.01); *G06T 2207/10028* (2013.01); *G06T 2207/20036* (2013.01); *G06T 2207/30196* (2013.01); *H04N 13/204* (2018.05)

(58) Field of Classification Search
  CPC . G06T 2207/10028; G06T 2207/10021; G06T 2207/20036; G05B 2219/40203; G05B 2219/37571; G05B 2219/37567; G05B 2219/39091; G05B 2219/49158; G05B 2219/49152; G05B 2219/40202; F16P 3/142; B25J 9/1676
  See application file for complete search history.

(56) References Cited

U.S. PATENT DOCUMENTS

| | | | |
|---|---|---|---|
| 7,315,738 B1 | 1/2008 | Delker et al. | |
| 7,783,386 B2* | 8/2010 | Merte | F16P 3/141 307/117 |
| 8,315,735 B2* | 11/2012 | Nihei | B25J 9/1676 318/568.11 |
| 8,315,738 B2* | 11/2012 | Chang | B25J 9/1666 700/248 |
| 8,326,590 B2* | 12/2012 | Kock | G05B 19/4061 703/8 |
| 2006/0049939 A1* | 3/2006 | Haberer | F16P 3/142 340/541 |
| 2006/0071135 A1 | 4/2006 | Trovato | |
| 2008/0021597 A1* | 1/2008 | Merte | F16P 3/141 700/255 |
| 2009/0125145 A1* | 5/2009 | Adachi | B25J 9/0003 700/250 |
| 2009/0237499 A1 | 9/2009 | Kressel et al. | |
| 2009/0316135 A1 | 12/2009 | Stein et al. | |
| 2009/0326711 A1* | 12/2009 | Chang | B25J 9/1666 700/248 |
| 2010/0063319 A1 | 3/2010 | Brtko et al. | |
| 2010/0161225 A1 | 6/2010 | Hyung et al. | |
| 2010/0191372 A1 | 7/2010 | Nihei et al. | |
| 2010/0198365 A1* | 8/2010 | Kawabata | G01S 7/4812 700/12 |
| 2011/0264266 A1* | 10/2011 | Kock | B25J 9/1676 700/253 |
| 2012/0209069 A1 | 8/2012 | Popovic et al. | |
| 2012/0327190 A1 | 12/2012 | Massanell et al. | |
| 2014/0022161 A1 | 1/2014 | Leyvand et al. | |
| 2014/0025204 A1 | 1/2014 | Schlaich et al. | |
| 2014/0067121 A1* | 3/2014 | Brooks | B25J 9/1676 700/255 |

OTHER PUBLICATIONS

Non-Final Office Action for U.S. Appl. No. 14/172,230, dated Jan. 15, 2015, 9 pages.
Non-Final Office Action for U.S. Appl. No. 14/172,230, dated May 4, 2015, 11 pages.
Notice of Allowance and Fee(s) Due for U.S. Appl. No. 14/172,230, dated Sep. 2, 2016.
Supplemental Notice of Allowability for U.S. Appl. No. 14/172,230, dated Sep. 25, 2016. 2 pages.
Stefan Hrabar, "3D Path Planning and Stereo-based Obstacle Avoidance for Rotorcraft UAV's", IEEE/RSJ International Conference on Intelligent Robots and Systes; Acropolis cCnvention Center, Nice, France, Sep. 22-26, 2008, 8 pages.
Dinesh Nair and Jagdishkumar K. Aggarwal, "Moving Obstacle Detection From a Navigating Robot", IEEE Transactions on Robotics and Automation, vol. 14, No. 3, Jun. 1998, 13 pages.
John Dayton, et al., Obstacle Avoidance System for UAV's using Computer Vision, Nov. 23, 2013, 1 page. Retrieved Jan. 24, 2017: http://sccur.whittier.edu/WCsccur/SCCUR/Abstract/ViewAbstract/obstacle-avoidance.
Lionel Heng, et al., "Real-Time Photo-Realistic 3D Mapping for Micro Aerial Vehicles", IEEE/RSJ International Conference on Intelligent Robots and Systems, San Francisco, CA., Sep. 25-30, 2011, 8 pages.
Kei Okada, et al., "Walking Human Avoidance and Detection from a Mobile Robot using 3D Depth Flow", IEEE International Conference on Robotics and Automation, Seoul, Korea, May 21-26, 2001, 6 pages.
Anandan, Tanya M., "Safety and Control in Collaborative Robotics", Published on: Aug. 6, 2013, Available at: http://www.controleng.com/industry-news/more-news/single-article/safety-and-control-in-collaborative-robotics/6fec60e21f303fa660c81bb2584236f8.html, pp. 1-4.
Anton et al., "Human-Robot Natural Interaction and Collision Avoidance in Flexible Manufacturing Cells", In Proceeding of Information Control Problems in Manufacturing, vol. 14, Part 1, May 2012, 2 pages, Bucharest, Romania.
Fischer et al., "3D Collision Detection for Industrial Robots and Unknown Obstacles using Multiple Depth Images", Published on: Jun. 9, 2009, Available at: http://www.ai3.uni-bayreuth.de/resypub/files/GWR09_MF.final_Kopfzeile.pdf, pp. 1-12, Braunschweig, Germany.
Flacco et al., "A Depth Space Approach to Human-Robot Collision Avoidance", Published on: May 14, 2012, Available at: http://www.dis.uniroma1.it/~labrob/pub/papers/ICRA12_DepthSpaceCollAvoid.pdf, IEEE International Conference on Robotics and Automation, pp. 338-345, St. Paul, MI, USA.
Flacco et al., "Multiple Depth/Presence Sensors: Integration and Optimal Placement for Human/Robot Coexistence", In IEEE International Conference on Robotics and Automation, May 3, 2010, pp. 3916-3923, Anchorage, Alaska, USA.
Hu et al., "Safety-based Human-Robot Collaboration in Cellular Manufacturing: A Case Study of Power Protector Assembly", In International Conference on Advanced Robotics and Intelligent Systems, May 31, 2013, pp. 28-31, Tainan, Taiwan.
National Robotics Engineering Center, "Hybrid Safety System (HSS)", Retrieved on: Oct. 25, 2013, Available at: http://www.rec.ri.cmu.edu/projects/hss/description/, 2 pages.
Ostermann, Bjorn, "Industrial Jointed Arm Robot Evading Dynamic Objects", Published on: Jan. 13, 2009, Available at: http://www.fh-brs.de/informatikmedia/Downloads/Personen/reinert/ostermann.pdf, pp. 1-126.
Rabaud, et al., "Counting Crowded Moving Objects", In IEEE Computer Society Conference on Computer Vision and Pattern Recognition, Jun. 17, 2006, 7 pages.
Rybski, et al., "Sensor Fusion for Human Safety in Industrial Workcells", in IEEE/RSJ International Conference on Intelligent Robots and Systems, Oct. 2012, 8 pages.
Schiavi et al., "Integration of Active and Passive Compliance Control for Safe Human-Robot Coexistence", In IEEE International Conference on Robotics and Automation, May 12, 2009, pp. 259-264, Kobe, Japan.
Tolgyess, et al., "The Kinect Sensor in Robotics Education", In Proceedings of 2nd International Conference on Robotics in Education, Sep. 2011, 4 pages, Bratislava, Slovakia.
Mikic, Ivana: "Human Body Model Acquisition and Tracking Using Voxel Data", International Journal of Computer Vision 53(3), Jan. 1, 2003, pp. 199-223—(retrieved from the internet http://homes.di.unimi.it/borghese/Teachi ng/ ntelligentSystems/Old/IntelligentSystems_

(56) References Cited

OTHER PUBLICATIONS

2004_2005/Documents/Vision/03_HumanBody_ Tracking_ MikicTrivediHunter.pdf ( Jun. 4, 2013)).
International Search Report issued in PCT Application No. PCT/US2015/013633, dated Feb. 5, 2016, 13 pages.
"International Preliminary Report on Patentability Issued in PCT Application No. PCT/US2015/013633", dated Jul. 8, 2016, 9 Pages.
Chinese Office Action and Search Report for CN 201580007104.8, dated Sep. 17, 2018, pp. 8, English translation attached (pp. 8).

* cited by examiner

CONTROLLING A ROBOT IN THE PRESENCE OF A MOVING OBJECT

CROSS-REFERENCE TO RELATED APPLICATIONS

This application is a continuation of U.S. patent application Ser. No. 14/172,230, filed Feb. 4, 2014, and entitled "CONTROLLING A ROBOT IN THE PRESENCE OF A MOVING OBJECT", the application of which is incorporated herein in its entirety by reference.

BACKGROUND

Robots are often used for tasks in industrial environments. For example, robots can be used for painting, moving parts, assembling items, and many other tasks. However, robots in motion may pose a hazard to humans and objects that enter the workspace of the robot. Two common approaches to preventing damage from moving robots, such as robot arms, have been implemented. These include placing a robot arm in a cage so that other objects cannot enter the field of operation. Another general approach has been to define exclusion zones covered by LIDAR, pressure mats, or similar sensors, which can be used to trigger a stop condition on the robot when there is an object in the exclusion zone. However, both of these approaches require significant effort to configure the workspace or to locate the robot in an isolated location.

SUMMARY

The following presents a simplified summary of the present embodiments in order to provide a basic understanding of some aspects described herein. This summary is not an extensive overview of the claimed subject matter. It is intended to neither identify critical elements of the claimed subject matter nor delineate the scope of the present embodiments. Its sole purpose is to present some concepts of the claimed subject matter in a simplified form as a prelude to the more detailed description that is presented later.

An embodiment provides a method for controlling a robot in the presence of a moving object. The method includes capturing a number of frames from a three-dimensional camera system and analyzing a frame to identify a connected object. The frame is compared to a previous frame to identify a moving connected object (MCO). If an unexpected MCO is in the frame the robot is instructed to take an action.

Another embodiment provides a system for controlling a robot in the presence of a moving object. The system includes a three dimensional camera, a processor, and a system memory. The system memory includes code that, when executed by the processor, is configured to collect a number of frames from the three dimensional camera, analyze a frame to identify connected objects, and compare the frame to a previous frame to identify a moving connected object (MCO). The code is also configured to determine if the MCO is not expected to be present, and, if so, send a signal to a robot controller.

In addition, another embodiment provides one or more computer-readable storage media for storing computer-readable instructions. The computer-readable instructions provide a system for controlling a robot in the presence of a moving object, the computer-readable instructions including code configured to capture a number of frames from a three-dimensional camera system, analyze a frame to identify a connected object, and compare the frame to a previous frame to identify a moving connected object (MCO). The computer-readable instructions also include code configured to determine if an unexpected MCO is in the frame, and, if so, instruct a robot to take an action.

The following description and the annexed drawings set forth in detail certain illustrative aspects of the claimed subject matter. These aspects are indicative, however, of but a few of the various ways in which the principles of the present embodiments may be employed, and the claimed subject matter is intended to include all such aspects and their equivalents. Other advantages and novel features of the claimed subject matter will become apparent from the following detailed description of the present embodiments when considered in conjunction with the drawings.

DETAILED DESCRIPTION

As discussed above, moving robots may pose a hazard to persons or objects that enter the proximity of the robot. For example, robotic arms used in industrial settings may be large heavy devices that have significant speed and momentum. While some depth based approaches have been implemented for controlling robots, these have mainly focused on complex collision avoidance calculations. The very complexity of these tools may make their use in industrial settings problematic.

Accordingly, there exists a need for a device that can reliably control the motion of a robot without adding unnecessary complexity to the process. Although current tools, such as light curtains and other sensors, may be used to form an exclusion zone around the robot, the complexity of the motions involved may add significant limitations to the workspace.

Therefore, embodiments described herein provide for the control of the motion of a robot using a three-dimensional camera that is used to determine the presence of an unexpected moving connected object (MCO) in an actionable region around a robot. The presence of the unexpected MCO may be used to control the motion of the robot. As used herein, a moving connected object is a group of three-dimensional pixels, termed voxels herein, which are determined to be substantially proximate and having consistent motion vectors, indicating that they are connected parts of a single object. As the robot moves under the control of a computing system, its expected motion may be identified from the robot controller and removed from the analysis. Similarly, the motion of any auxiliary equipment in the hazard zone, such as conveyor belts, automatic carts, assembly lines, and the like, may also be removed from the analysis. Any remaining moving connected objects may be identified as unexpected. Depending on the location of the unexpected moving connected objects, the motion of the robot may be controlled, e.g., by slowing or stopping the robot's motion.

Figure 1:
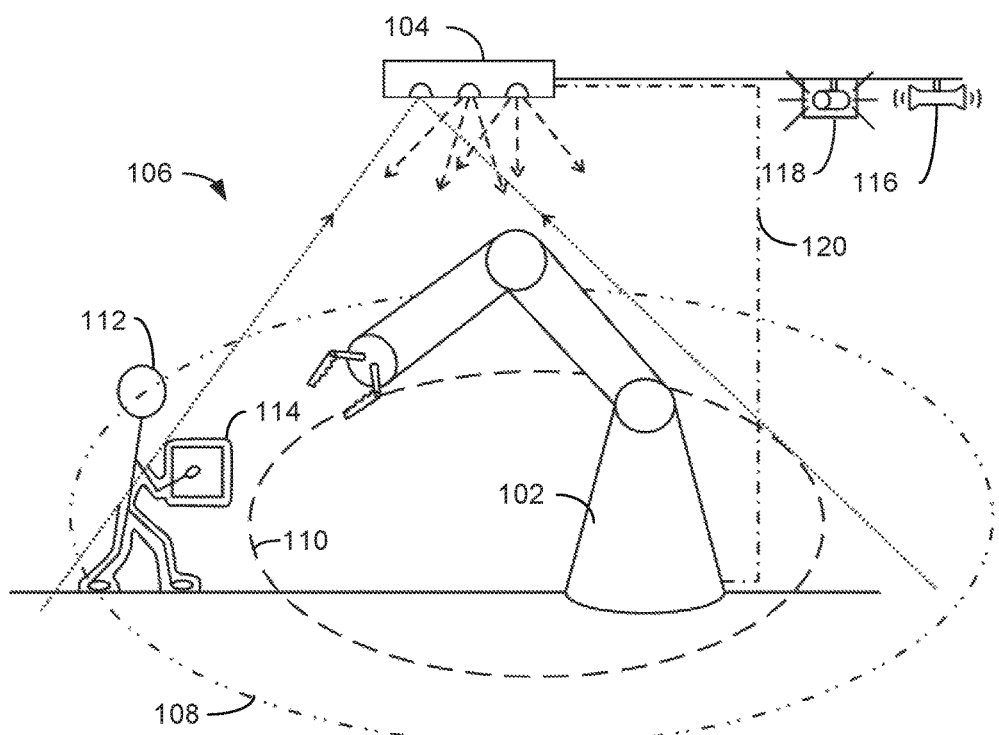
FIG. 1 is a schematic diagram of a robot arm with a motion sensing camera placed above the workplace to define a warning zone and an exclusion zone for the robot arm.

As a preliminary matter, some of the figures describe concepts in the context of one or more structural components, variously referred to as functionality, modules, features, elements, or the like. The various components shown in the figures can be implemented in any manner, such as via software, hardware (e.g., discrete logic components), firmware, or any combinations thereof. In some embodiments, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrases "configured to" and "adapted to" encompass any way that any kind of functionality can be constructed to perform an identified operation. The functionality can be configured (or adapted) to perform an operation using, for instance, software, hardware, firmware, or the like.

The term "logic" encompasses any functionality for performing a task. For instance, each operation illustrated in the flowcharts corresponds to logic for performing that operation. An operation can be performed using, for instance, software, hardware, firmware, or the like.

As used herein, the terms "component," "system," and the like are intended to refer to a computer-related entity, either hardware, software (e.g., in execution), or firmware, or any combination thereof. For example, a component can be a process running on a processor, an object, an executable, a program, a function, a library, a subroutine, a computer, or a combination of software and hardware.

By way of illustration, both an application running on a server and the server can be a component. One or more components can reside within a process, and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable storage device or media.

Computer-readable storage media can include but are not limited to magnetic storage devices (e.g., hard disk, floppy disk, and magnetic strips, among others), optical disks (e.g., compact disk (CD) and digital versatile disk (DVD), among others), smart cards, and flash memory devices (e.g., card, stick, and key drive, among others). In contrast, computer-readable media (i.e., not storage media) generally may additionally include communication media such as transmission media for wireless signals and the like.

FIG. 1 is a schematic diagram of a robot system 100 having a robot arm 102 and a depth sensing camera 104 placed above the workspace 106 to define a warning zone 108 and a hazard zone 110 around the robot arm 102. In this embodiment, the depth sensing camera 104 is placed above the workspace 106, giving a clear field of view around the robot arm 102. In other embodiments, the depth sensing camera 104 may be placed to the side of a robot, for example, at entrances to the workspace 106. In an embodiment, the depth sensing camera 104 may be placed on the robot itself, for example, on the front surface of the casing of the robot arm 102, directly below the robot arm 102.

The depth sensing camera 104 may be an RGB-D type camera, such as the Kinect™ camera used for the Xbox™ video games from Microsoft™ corporation. However, the techniques described herein are not limited to this camera, as any number of other systems may be used to identify moving connected objects (MCOs) within the workplace 106. Such cameras may include depth sensing cameras available from Mesa Imaging AG, SoftKinetic, and others. Many of these cameras use infrared (IR) or near-IR lasers to project light onto a scene, and calculate the depth map from the detected reflected light using known time-of-flight (TOF) algorithms. Other types of systems may be used in addition to, or instead of, TOF based systems. For example, stereoscopic cameras available from The ImagingSource LLC®, or StereoVision Imaging, Inc., may be used. These cameras use two, or more, offset cameras to collect each frame, and calculate the position of each object within a frame by the shift in position of each pixel associated with an object.

Using any of these systems, when an object 112, such as a person, enters the detection space, the depth sensing camera 104 determines that a group of voxels 114 having a proximate location to each other is within a collected frame. The group of voxels 114 is identified as a connected object. The grouping of the voxels to form the connected object may be controlled by a previously determined error range. Thus, the grouping may proceed even if the voxels detected by the depth sensing camera 104 are not filling all of the space of the connected object. The grouping is repeated for the next frame, forming a connected object within that frame. The location of the connected object in the next frame is compared to the location of the connected object in the previous frame to determine motion vectors for the voxels. Voxels with inconsistent motion vectors may be eliminated, and the remaining group of voxels 114 may be identified as a moving connected object (MCO).

The robot arm 102, if moving, may also be detected as an MCO. However, the motion of the robot arm 102 can be determined from the control sequences of the robot controller. Accordingly, when the robot arm 102 is moving, the voxels detected form an expected MCO, which may be disregarded. Any additional expected motion of objects within the workspace 106, such as conveyor belts, automated carts, and the like, may also be disregarded as expected MCOs. The detection may include a simple count of MCOs at each collected frame, wherein expected MCOs are subtracted from the count. If the count remains above zero once all expected MCOs are removed, further actions may be triggered.

If an unexpected MCO, such as an object 112, is detected within the workplace 106, a number of different actions may take place, depending on the proximity of the human 112 to the robot arm 102. For example, if the object 112 is within the warning zone 108, an audible warning system 116, a visual warning system 118, or both, may be activated. Further, the motion of the robot arm 102 may be slowed, to allow for a full stop if the object 112 approaches closer. In addition to the activation of any warning systems 116 and 118, if the object 112 is detected within the hazard zone 110, the robot arm 102 may be stopped. This may include any auxiliary equipment that is used by the robot arm 102 for operations, such as conveyor belts, automated carts, paint systems, compressors, and the like. Other actions, such as slowing the robot arm 102 and moving it to a position proximate to the object 112, for example, for interaction with the object 112, may also be performed.

FIG. 1 is not limited to the items shown, but may include any number of other items that are not shown. For example, the workspace 106 may include the auxiliary equipment mentioned above. Further, the configuration of items may be different than shown. For example, the robot does not have to be a robot arm 102, but may be an automated crane, an automated cart, or any number of other items. In some embodiments, multiple depth sensing cameras may be placed over an elongated workspace, such as a cart path, to alert workers. In this case, the warning region 108 and hazard region 110 may be defined as surrounding each moving vehicle, which would be identified as an expected MCO. The visual warning system 118 and audible warning system 116 could then be mounted on the moving vehicles themselves. The system 100 is FIG. 1 is shown as a single unit system with a depth sensing camera 104 coupled to the robot arm 102 through a signal line 120. However, embodiments are not limited to this configuration, and may include separate units suitable for retrofitting current systems, as discussed herein.

Figure 2:
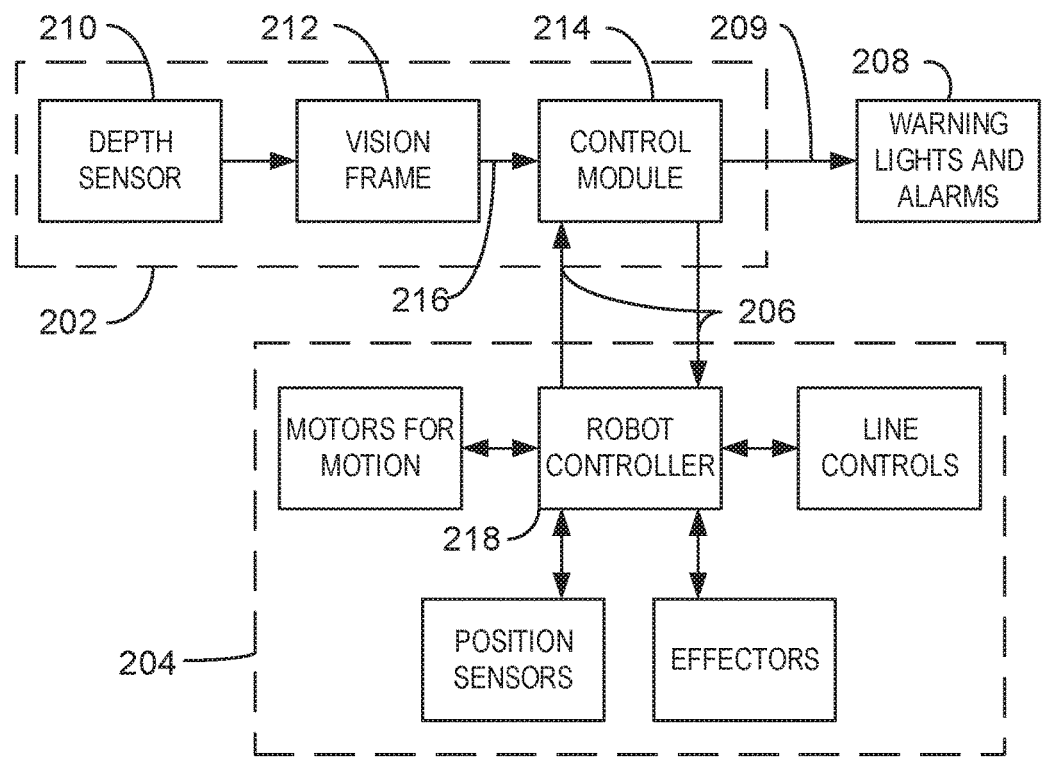
FIG. 2 is a block diagram of a two unit system for controlling the motion of a robot in the presence of a moving object.

FIG. 2 is a block diagram of a two unit system 200 for controlling the motion of a robot in the presence of a moving object. In the two unit system 200, a detection module 202 is communicatively coupled to a robot 204 by signal lines 206. The detection module 202 may also be communicatively coupled to warning systems 208 through signal lines 209.

The detection module 202 includes a depth sensor 210, such as the RGB-D camera discussed above. The depth sensor 210 is used to capture frames by a vision module 212. The vision module 212 may use various techniques to determine groups of connected voxels in the frame, and comparisons to subsequent frames to determine regions of motion in the image. These regions can then be identified as MCOs. At each frame the number of MCOs 216 is reported to a control module 214.

In addition to the number of MCOs 216 reported by the vision module 212, the control module 214 accepts input from a robot controller 218 over the signal lines 206. The information from the robot controller 218 may be as simple as a signal of whether the robot is in motion or may include more detailed information regarding the state of the robot. If the robot is in motion, a stop command may be sent to the robot controller 218 if more than two MCOs are indicated by the vision module 212. If the robot is not currently in motion, a stop command may be sent to the robot controller 218 if any MCOs, i.e., unexpected MCOs, are reported by the vision module. The reports of motion from the vision module 212 may be filtered over multiple frames to prevent false positives. In one embodiment, the expected number of MCOs may be observed over multiple frames.

In can be noted that this implementation does not require complex identification or positioning data for the MCOs, including the robot, but merely a count of how may unexpected MCOs are present. In other embodiments, multiple zones may be defined around the workspace with different levels of warning.

Figure 3:
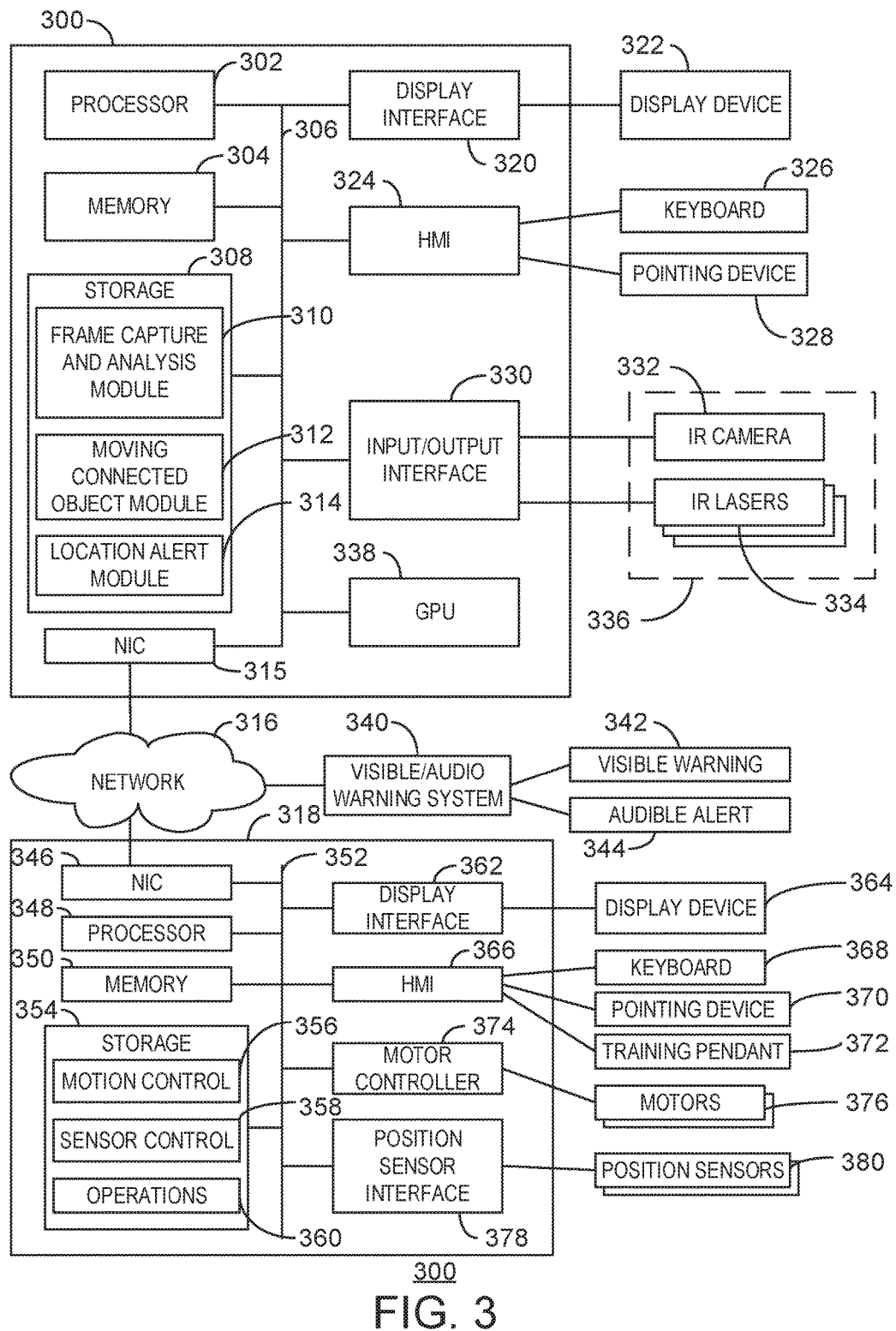
FIG. 3 is a block diagram of a robot including a control system for controlling motion in the presence of a moving object.

FIG. 3 is a block diagram of a computing system 300 that includes separate units, which may be used to control the motion of a robot in the presence of a moving object according to embodiments described herein. The computing system 300 may include a processor 302, e.g., a central processing unit (CPU), that is adapted to execute stored instructions, as well as a memory device 304 that stores instructions that are executable by the processor 302. Such instructions may be used to detect MCOs in a workspace occupied by a robot, and control the motion of the robot. The processor 302 can be a single core processor, multi-core processor, computing cluster, or any number of other configurations. The memory device 304 can include random access memory (RAM), read only memory (ROM), flash memory, or any other suitable memory systems.

The processor 302 may be connected through a bus 306 to a storage device 308 adapted to store a frame capture and analysis module 310, a moving connected object module 312, and a location alert module 314. The storage device 308 may be a hard drive, an optical drive, a thumb drive, an array of drives, or any combinations thereof. A network interface controller 315 may be adapted to connect the processor 302 through the bus 306 to a network 316. Through the network 316, control signals may be sent to a robot controller 318 for slowing or stopping motion when unexpected MCOs are present, and for restarting motion when the area around the robot is clear of unexpected MCOs.

The processor 302 may be linked through the bus 306 to a display interface 320 adapted to connect the system 300 to a display device 322. The display device 322 can include a computer monitor, camera, television, projector, virtual reality display, three-dimensional (3D) display, or mobile device, among others. A human machine interface 324 within the computing system 300 may connect the processor 302 to a keyboard 326 and a pointing device 328. The pointing device 328 can include a mouse, trackball, touchpad, joy stick, pointing stick, stylus, or touchscreen, among others.

The processor 302 may also be linked through the bus 306 to an input/output interface 330 adapted to connect the computing system 300 to any number of additional input/output devices. For example, the input/output interface 330 may connect the computing system 300 to an IR camera 332 and one or more IR lasers 334. In some embodiments, the IR camera 332 and IR lasers 334 may be included within a single imaging device 336. The imaging device 336 may be a 3D camera, gaming system, RGB-D camera, computer, or the like. Further, the imaging device 336 does not need to be based on IR lasers and the like, but may include stereoscopic technologies. In other embodiments, all or a portion of the IR lasers 334 may be externally connected to an imaging device including the IR camera 332. Further, in some embodiments, the computing system 300 may be an imaging device. In such embodiments, the IR camera 332 and the IR lasers 334 may reside within the computing system 300, rather than being externally connected to the computing system 300 via the input/output interface 330.

Further, the computing system 300 may include a graphics processing unit (GPU) 338. The GPU 338 may be linked through the bus 306 to the processor 302, the memory device 304, the storage device 308, the input/output interface 330, and any number of other components of the computing system 300. In various embodiments, the GPU 338 is adapted to execute instructions, such as the instructions stored in the memory device 304, either in conjunction with or independently of the processor 302. For example, the GPU 338 may execute all or a portion of the instructions that are used to implement the method for analyzing frame data to determine the presence of MCOs in a series of frames. For example, in some embodiments, the processor 302 and the GPU 338 may be used in parallel for the reconstruction of frame data in captured images. In such embodiments, the frame data may be reconstructed at a rate of at least about 20 frames per second (fps), providing a fast action for the control of the motion of the robot. Higher or lower frame reconstruction rates can be achieved, depending on the processor 302 and GPU 338 used. Higher reconstruction rates, such as 30 fps, 40 fps, or higher, may be useful when a robot is interacting with an unexpected MCO, for example, removing parts from an automated cart. Lower reconstruction rates, such as 20 fps, 10 fps, or lower, may provide adequate coverage at a lower cost, for example, in systems used to slow or stop a robot based on a location of an unexpected MCO.

Through the network 316, the computing system 300 may be coupled to a warning system 340, which may include visible warning systems 342, such as flashing lights, and audible alert systems 344, such as sirens or klaxons. It can be understood that the warning system 340 may be directly coupled to the computing system 300, for example, through the input/output interface 330.

In this embodiment, the robot controller 318 may include a network interface card 346 for communications with the computing system 300 over the network 316. The robot controller 318 may also include similar units to the computing system 300. For example, the robot controller 318 may include a processor 348, e.g., a central processing unit (CPU), that is adapted to execute stored instructions, as well as a memory device 350 that stores instructions that are executable by the processor 348. Such instructions may be include the operational code for the robot, such as code to control the motion of the robot. The processor 348 can be a single core processor, multi-core processor, computing cluster, or any number of other configurations. Further, the processor 348 may be part of a microcontroller, a distributed control system (DCS), a programmable logic controller (PLC), or other types of plant control systems. The memory device 350 can include random access memory (RAM), read only memory (ROM), flash memory, or any other suitable memory systems.

The processor 348 may be connected through a bus 352 to a storage device 354 adapted to store a motion control module 356, a sensor or position detection module 358, and an operations module 360, for example, including the robots specific operational program. The storage device 354 can include a hard drive, an optical drive, a thumb drive, an array of drives, or any combinations thereof.

The network interface controller 346 may be adapted to connect the processor 348 through the bus 352 to the network 316. Through the network 316, control signals may be sent to the robot controller 318 for slowing or stopping motion when unexpected MCOs are present, and for restarting motion when the area around the robot is clear of unexpected MCOs.

The processor 348 may be linked through the bus 352 to a display interface 362 adapted to connect the robot controller 318 to a display device 364. The display device 364 can include an LCD screen, a computer monitor, or a mobile device, among others. A human machine interface 366 within the robot controller 318 may connect the processor 348 to a keyboard 368, a pointing device 370, or a training pendant 372. The pointing device 370 can include a mouse, trackball, touchpad, joy stick, pointing stick, stylus, or touchscreen, among others. The training pendant 372 can be used to enter the operational program into the operations module 360, by training the movement of the robot. During training, the vision module may be disabled to allow the training to be performed.

The processor 348 may also be linked through the bus 352 to a motor controller 374 adapted to connect the robot controller 318 to any number of motors 376 to control the motion of the robot. For example, the motor controller 374 may control motors for a robot arm, allowing the robot arm to rotate vertically on a base, extend out from the base, open and close grippers, or other effectors, and the like.

The processor 348 may also be linked through the bus 352 to a position sensor interface 378. The position sensor interface 378 may link the robot controller 318 to a number of position sensors 380 that may let the robot controller 318 know the current position of the robot. For example, a robot arm may include optical sensors at each joint to let the robot controller 318 know the position of the robot arm at that joint.

The block diagram of FIG. 3 is not intended to indicate that the computing system 300 is to include all the components shown in FIG. 3. Further, the computing system 300 may include any number of additional components not shown in FIG. 3, depending on the details of the specific implementation. For example, controllers for auxiliary equipment, as described above, may be coupled to the network, and in communication with the computing system 300 and the robot controller 318. As mentioned, the system is not limited to two units, but may have the functionality in a single apparatus.

Figure 4:
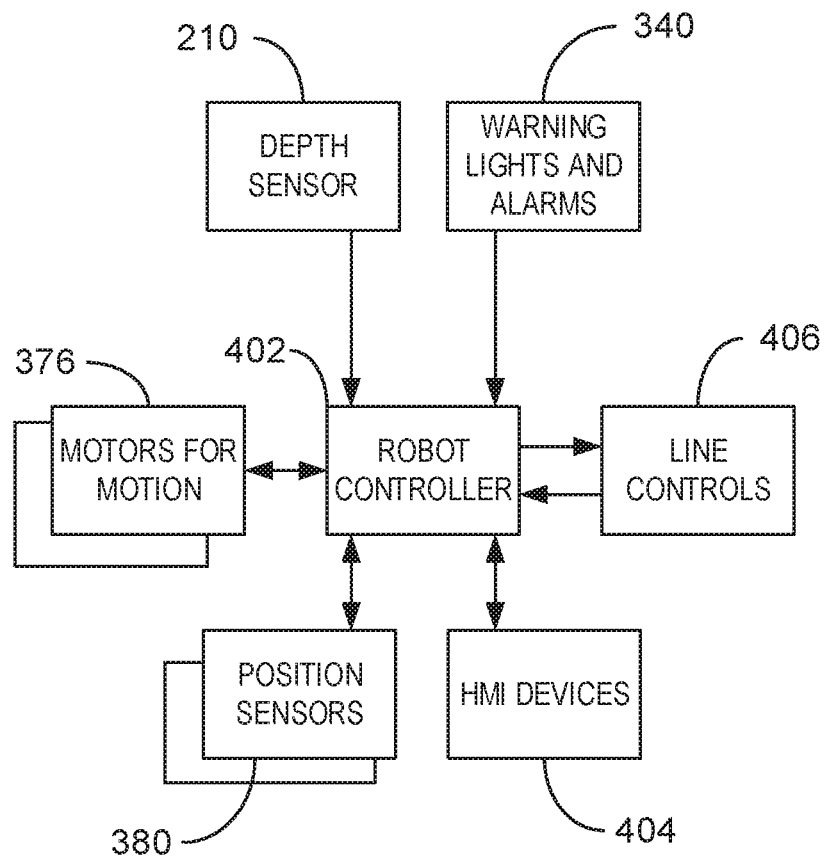
FIG. 4 is a block diagram of a computing system that may be used to control the motion of a robot in the presence of a moving object according to embodiments described herein.

FIG. 4 is a block diagram of a robot 400 that includes a visual system for controlling motion in the presence of a moving object. Like numbered items are as described above. In the embodiment shown in FIG. 4, the robot controller 402 is directly coupled to a depth sensor 210 for detection of unexpected MCOs in a workspace. As discussed with respect to FIG. 5, this combines the functionality of the two separate units into a single robot controller 402. In this embodiment, the human machine interface devices (HMI) 404 can include a display, pointing device, keyboard, or training pendant, as described above. Further, the robot controller 402 may also interact with line controls 406, which may control auxiliary equipment, such as conveyor belts, and the like.

Figure 5:
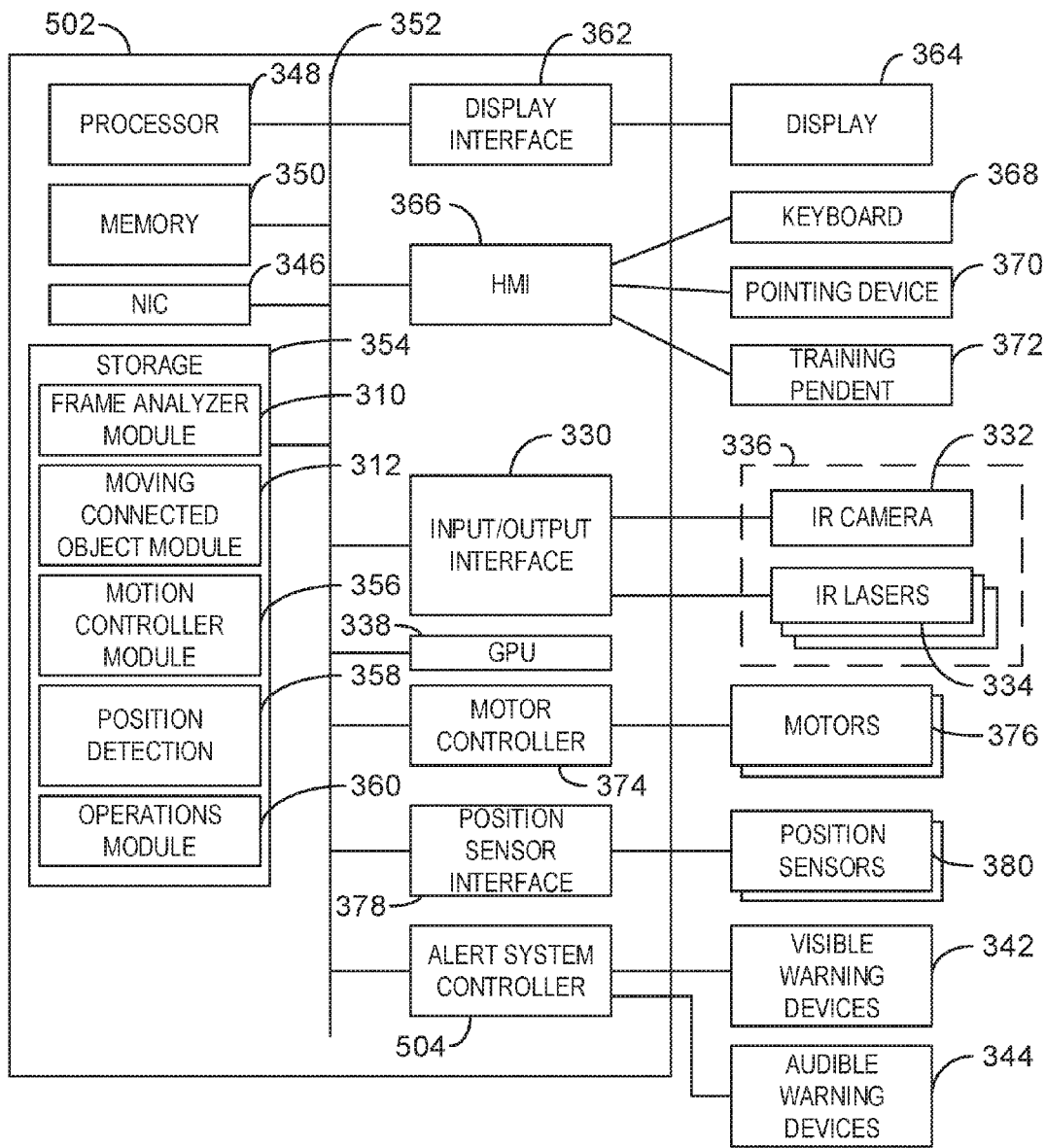
FIG. 5 is a block diagram of a robot that may be used in the presence of a moving object according to embodiments described herein.

FIG. 5 is a block diagram of a robot 500 that may be used in the presence of a moving object according to embodiments described herein. Like numbered items are as described above. In this embodiment, all of the functionality of the two unit system, described with respect to FIG. 3, has been incorporated into the robot control 502. Further, an alert system controller 504 may be used to control the warning devices 342 and 344.

Figure 6:
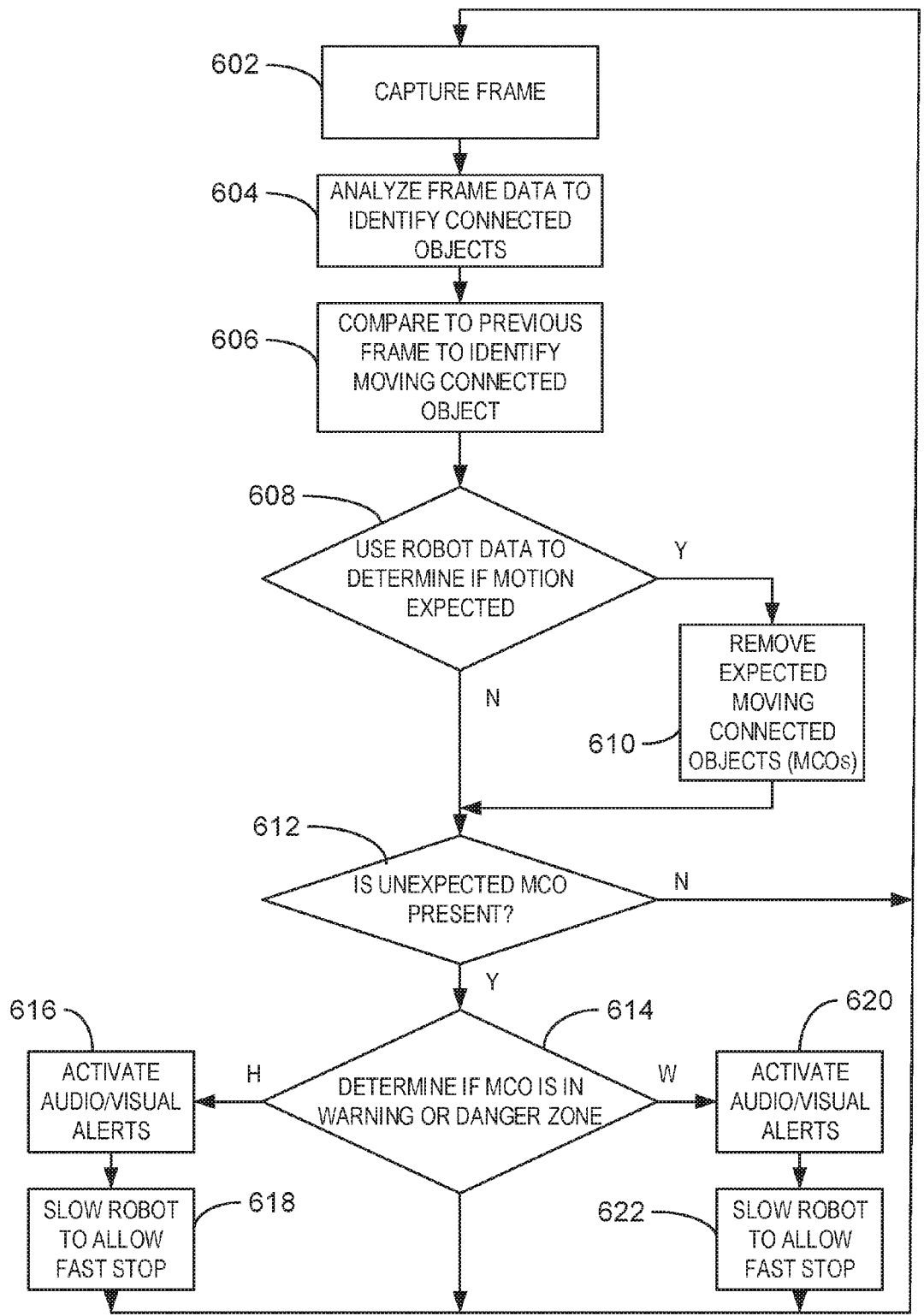
FIG. 6 is a process flow diagram of a method for controlling a robot in the presence of a moving object.

FIG. 6 is a process flow diagram of a method 600 for controlling a robot in the presence of a moving object. The method 600 starts at block 602 with the capturing of a frame, or image, of the workspace. This may be performed using a depth camera (RGB-D) or a stereoscopic camera, as described above. At block 604, the frame data is analyzed to identify connected objects. This may be performed as described with respect to FIG. 1. At block 606, the frame data is compared to a previous frame to identify motion. Any connected object showing motion can be identified as a moving connected object (MCO). A total count of MCOs is made for objects within the boundaries of the workspace.

At block 608, data from the robot controller can be used to determine if motion is expected for the robot, auxiliary equipment, or both. If motion is expected, at block 610, every MCO for which motion is expected can be removed from the count.

Process flow proceeds to block 612 to determine if an unexpected MCO is present, e.g., if the count of MCOs remains at one or greater after all expected MCOs have been removed. If not, process flow returns to block 602 to continue.

If an unexpected MCO is present at block 612, process flow may proceeds to block 614 to locate the unexpected MCO, for example, in a hazardous region (H), a warning region (W). In some embodiments, block 612 may be eliminated and process flow may go directly to block 616.

If the unexpected MCO is in a hazardous region, process flow may proceed to block 616. At block 616, audible warnings, visual warnings, or both are activated. At block 618, the motion of the robot is stopped. Process flow then resumes at block 602. It can be noted that when the unexpected MCO count returns to zero, the alerts may be stopped and motion restarted automatically. In some embodiments, the motion can continue to be halted until an operator allows motion to resume.

If the unexpected MCO is in a warning region, process flow proceeds to block 620. At block 620, audible warnings, visual warnings, or both are activated. At block 622, the motion of the robot is slowed. Process flow then resumes at block 602. It can be noted that when the unexpected MCO count returns to zero, the alerts may be stopped and the robot may be allowed to return to full speed automatically.

The method 600 is not limited to the blocks shown. For example, blocks may be added to control auxiliary equipment, based, at least in part, on the detection of unexpected MCOs. The motion of the robot may include other actions, such as moving the robot proximate to an unexpected MCO at a slow speed to allow interaction between the unexpected MCO and the robot. Further, as mentioned above, not all blocks have to be present. Block 614 may be eliminated if there is only one zone used.

Figure 7:
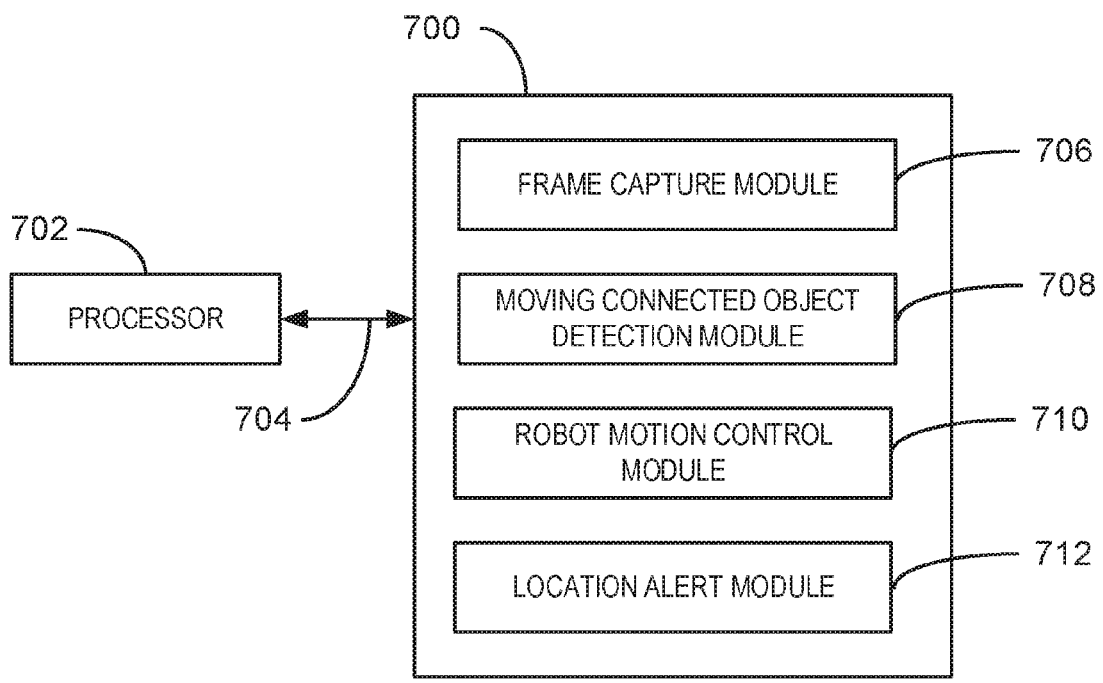
FIG. 7 is a block diagram of a computer-readable storage medium that stores code adapted to control a robot in the presence of a moving object.

FIG. 7 is a block diagram of a computer-readable storage medium 700 that stores code adapted to control a robot in the presence of a moving object. The code is accessible by a processor 702 over a bus 704. The computer-readable storage medium may include hard drives, thumb-drives, ram-drives, or any number of other units, as described with respect to FIG. 2. The code may include, for example, a frame-capture module 706 configures to capture a frame from a depth sensing camera. A moving connected object module 708 may be used to analyze a current frame and compare the results to results for a past frame to identify MCOs in the frames. A robot motion control module 710 may be used to keep track of the number of unexpected MCOs in the workspace, for example, based on data from the moving connected object module 708 and a robot controller. A location alert module 712 can then be used to instruct a robot to slow or stop motion.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, performed by a processor, for controlling a robot in the presence of a moving object, comprising:
analyzing a frame captured by a three-dimensional camera to identify a connected object comprising substantially proximate voxels;
determining motion vectors for the substantially proximate voxels based at least in part on the frame and a previous frame captured by the three-dimensional camera;
identifying a moving connected object (MCO) comprising the substantially proximate voxels, based at least in part on whether the motion vectors for the substantially proximate voxels are consistent;
determining if the MCO is an unexpected MCO based at least in part on an expected motion of the robot; and
instructing the robot to perform an action in response to determining the MCO is unexpected.

2. The method of claim 1, wherein determining if the MCO is unexpected is based at least in part on auxiliary objects within the frame.

3. The method of claim 1, wherein analyzing the frame comprises forming a group comprising the substantially proximate voxels to form connected objects.

4. The method of claim 1, comprising determining if the unexpected MCO is in an actionable region.

5. The method of claim 4, wherein the action taken is to activate an audible warning if the unexpected MCO is in the actionable region.

6. The method of claim 4, wherein the action taken is to activate a visual warning if the unexpected MCO is in the actionable region.

7. The method of claim 4, comprising slowing a motion of the robot if the unexpected MCO is in a warning zone.

8. The method of claim 4, comprising stopping a motion of the robot if the unexpected MCO is in a hazard zone.

9. The method of claim 8, comprising slowing a motion of the robot and moving the robot towards the unexpected MCO to allow interaction with the unexpected MCO.

10. The method of claim 2, wherein identifying the MCO comprises:
comparing a location of a group of voxels forming a connected object to a previous location of the group of voxels forming the connected object;
eliminating any voxels that have inconsistent motion vectors; and
defining remaining voxels in the group of voxels as the MCO.

11. A system for controlling a robot in a presence of a moving object, comprising:
a three dimensional camera;
a processor; and
a system memory comprising code that, based at least in part on execution by the processor, is configured to:

analyze a frame captured by a three-dimensional camera to identify an object in relative motion to the robot;

determine motion vectors for voxels representing the object based at least in part on the frame and a previous frame captured by the three-dimensional camera;

group proximate voxels having consistent motion vectors;

determine if the object is unexpected based at least in part on an evaluation of expected relative motion of the robot and the grouped proximate voxels; and instruct the robot to take an action if the object is determined to be unexpected.

12. The system of claim 11, the robot being in motion.

13. The system of claim 11, the object being in motion.

14. The system of claim 11, the object being a moving connected object.

15. The system of claim 11, the three-dimensional camera being part of the robot.

16. The system of claim 11, wherein the system memory comprises code that, based at least in part on execution by the processor, is configured to activate a visual warning system, an audible warning system, or both, when the object enters a hazardous region or a warning region.

17. One or more computer-readable storage media for storing computer-readable instructions, the computer-readable instructions providing a system for controlling a robot in a presence of a moving object, the computer-readable instructions, based at least in part on execution by a processor, being configured to:

capture a plurality of frames from a three-dimensional camera system;

analyze one of the frames to identify a plurality of connected objects, each of the connected objects comprising substantially proximate voxels;

compare a location of each of the connected objects in the one frame to a location of each of the connected objects in a previous frame of the frames to determine motion vectors for the substantially proximate voxels;

compare the one frame to the previous frame to identify a moving connected object (MCO) comprising the substantially proximate voxels, wherein the motion vectors for the substantially proximate voxels are consistent;

determine if the MCO is an unexpected MCO based at least in part on an expected motion of the robot; and instruct the robot to take an action.

18. The one or more computer-readable storage media of claim 17, wherein the computer-readable instructions, based at least in part on execution by the processor, are configured to stop a motion of the robot if the unexpected MCO is in a hazardous region.

* * * * *